US 6,679,680 B2

(12) United States Patent
Um et al.

(10) Patent No.: US 6,679,680 B2
(45) Date of Patent: Jan. 20, 2004

(54) BUILT-UP GAS TURBINE COMPONENT AND ITS FABRICATION

(75) Inventors: Jae Y. Um, Cincinnati, OH (US); Craig Carmichael, Albuquerque, NM (US); David E. Budinger, Loveland, OH (US); Joshua L. Miller, West Chester, OH (US); Ronald L. Galley, Mason, OH (US); Douglas M. Carlson, Cedar Crest, NM (US)

(73) Assignee: General Electric Company, Schenectady, NY (US)

( * ) Notice: Subject to any disclaimer, the term of this patent is extended or adjusted under 35 U.S.C. 154(b) by 50 days.

(21) Appl. No.: 10/107,026

(22) Filed: Mar. 25, 2002

(65) Prior Publication Data

US 2003/0180143 A1 Sep. 25, 2003

(51) Int. Cl.⁷ ................................................. F01D 11/08
(52) U.S. Cl. ..................................................... 415/173.1
(58) Field of Search .......................... 415/173.1, 173.6, 415/173.4, 174.4; 29/889.2

(56) References Cited

U.S. PATENT DOCUMENTS

| 5,553,999 A | 9/1996 | Proctor et al. |
| 5,593,276 A | 1/1997 | Proctor et al. |
| 5,822,852 A * | 10/1998 | Bewlay et al. ............. 29/889.1 |
| 6,233,822 B1 | 5/2001 | Grossklaus, Jr. et al. |
| 6,283,356 B1 * | 9/2001 | Messelling .................. 228/119 |
| 6,464,128 B1 * | 10/2002 | Messelling et al. ......... 228/119 |

* cited by examiner

*Primary Examiner*—Ninh H. Nguyen
(74) *Attorney, Agent, or Firm*—Gregory O. Garmong; Carmen Santa Maria; McNees Wallace & Nurick LLC

(57) ABSTRACT

A built-up gas turbine component is prepared by providing a gas turbine component having a component surface and being made of a component base metal having a component base metal composition. A buildup tape is supplied having a net metallic buildup composition different from the component base metal composition. The buildup tape includes a first metallic constituent having a first melting point, and a second metallic constituent having a second melting point. The first metallic constituent and second metallic constituent together have the net metallic buildup composition. A non-metallic binder binds together the first metallic constituent and the second metallic constituent. The buildup tape is applied to the component surface and heated to a brazing temperature greater than the first melting point and less than the second melting point. The first metallic constituent melts and fuses the first metallic constituent and the second metallic constituent to the component surface as a buildup deposit on the built-up gas turbine component.

19 Claims, 4 Drawing Sheets

BUILT-UP GAS TURBINE COMPONENT AND ITS FABRICATION

This invention relates to a gas turbine engine, and more particularly to the restoration of the dimensions of components of the gas turbine engine.

BACKGROUND OF THE INVENTION

In a gas turbine engine, air is drawn into the forward end of the engine and compressed by a shaft-mounted axial flow compressor. The compressed air is mixed with fuel in the combustors, and the fuel is ignited. The resulting combustion gas flows through and turns a shaft-mounted axial flow turbine, which drives the compressor. The combustion gases flow from the aft end of the engine, driving it and the aircraft forward.

The turbine includes a turbine disk with turbine blades that project radially outwardly into the gas path of the combustion gas. An annular stationary shroud encircles the turbine blades and defines the gas path through which the combustion gas flows. The stationary shroud is circumferentially segmented. The stationary shroud segments are supported from the outer casing of the engine by a set of circumferentially segmented shroud hangers.

The shroud hanger segments are connected to the outer casing with an outer hook structure that allows these components to expand and contract at different rates without warping. Similarly, the shroud hanger segments and the stationary shroud segments are interconnected with an inner hook structure that allows these components to expand and contract at different rates without warping. These floating interconnections, rather than rigid welded or bolted interconnections, are required because of the radial temperature differentials experienced as the gas turbine engine is operated.

While this hook structure is operable and widely used, there are sometimes problems experienced because its required dimensions are not achieved in manufacturing or are lost during service. Similar dimensional-variation problems are experienced with other components of the gas turbine engine as well. There is accordingly a need for an improved approach to maintaining the dimensions of the shroud hanger segments and other structure in the engine. The present invention fulfills this need, and further provides related advantages.

BRIEF SUMMARY OF THE INVENTION

The present invention provides a method for preparing a built-up gas turbine component in which a key dimension is brought within a specified dimensional tolerance. This approach produces a finished part whose built-up dimension is established to within close tolerances, without the need for final machining. The approach uses a non-line-of-sight technique. There is no chipping of the material, as may occur where thermal sprays are used. The process does not introduce any distortion in the finished built-up component. The approach may be applied to both nickel-base and cobalt-base alloys, and to a wide variety of types of components. Examples include shroud hangers, shrouds, and combustor components, with shroud hangers being of most interest.

A method for preparing a built-up gas turbine component includes providing a gas turbine component having a component surface and made of a component base metal having a component base metal composition. The gas turbine component may be either a newly made article or an article which has been in service and is being returned for repair and/or refurbishment. A buildup tape is supplied having a net metallic buildup composition different from the component base metal composition. The buildup tape includes a first metallic constituent having a first melting point, and a second metallic constituent having a second melting point. The first metallic constituent and second metallic constituent together comprise the net metallic buildup composition. The buildup tape additionally includes a nonmetallic binder binding together the first metallic constituent and the second metallic constituent. The method further includes applying the buildup tape to the component surface, and heating the buildup tape and the component surface to a brazing temperature greater than the first melting point and less than the second melting point. The first metallic constituent melts and fuses the first metallic constituent and the second metallic constituent to the component surface as a buildup deposit on the built-up gas turbine component.

The present approach is preferably practiced to adjust the dimensions of a shroud hanger having a forward hook structure including a forward radially outer hook structure having a forward outer hook land structure thereon, and a forward radially inner hook structure having a forward inner hook land structure thereon; and an aft hook structure including an aft radially outer hook structure having an aft outer hook land structure thereon, and an aft radially inner hook structure having an aft inner hook land structure thereon. The step of applying includes the step of applying the buildup tape to at least one of the land structures.

The gas turbine component may be made of a nickel-base superalloy base metal, and the buildup tape typically has a nickel-base alloy net metallic buildup composition. The gas turbine component may be made of a cobalt-base material, and the buildup tape typically has a nickel-base or a cobalt-base composition.

In one form, the nickel-base buildup tape has the first metallic constituent having a first-constituent composition, in weight percent, of from about 10 to about 30 percent chromium, from about 5 to about 12 percent silicon, balance nickel and minor amounts of other elements and impurities, and the second metallic constituent having a second-constituent composition, in weight percent, of about 99 percent by weight nickel, balance minor amounts of other elements and impurities. Preferably, the first metallic constituent has a first-constituent composition, in weight percent, of from about 18 to about 20 percent chromium, about 9.75 to about 10.5 percent silicon, balance nickel and minor amounts of other elements and impurities. The buildup deposit may be of any required thickness, but it preferably has a thickness of from about 0.001 inch to about 0.004 inch, and most preferably has a thickness of from about 0.002 inch to about 0.003 inch.

Thus, for example, a built-up gas turbine shroud hanger is made of a nickel-base superalloy base material and has a hook structure as described above. There is a shroud-hanger buildup deposit on at least one of the hook land structures. The shroud buildup deposit is made of a nickel-base alloy buildup material different in composition from the nickel-base superalloy base material, and is typically an alloy comprising nickel, chromium, and silicon. Other features of the invention as discussed above may be used with this embodiment.

The application of the shroud buildup deposit is most conveniently accomplished by furnishing a braze metal tape, and brazing the braze metal tape to the areas whose dimension is to be increased. The braze metal tape is a multi-component tape, such as a two-component tape, having a net composition required for the buildup material.

When shroud hangers are assembled into a gas turbine engine, it is crucial that the dimensions in the area of the land structures be precise, typically to tolerances of no more than +/−0.001 inch. If the dimensions are outside of these tolerances, the shroud hanger typically does not fit together properly with the case and/or the shroud. New, as-cast and machined shroud hangers and shroud hangers that have seen service often have dimensions of the land structures that are outside of the tolerances in the areas of the land structures, and consequently do not function properly. If the dimensions of the land structures of the new shroud hangers are too large, the excess material may be machined away. If the dimensions of the land structures of new shroud hangers or shroud hangers that have returned from service are under the limits set by the dimensional tolerances, in the past it has been common practice to scrap the shroud hanger. The present approach provides a technique for repairing this problem and increasing the dimensions in the land structures of such shroud hangers, so that the dimensions are within tolerance and the article may be used in service.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
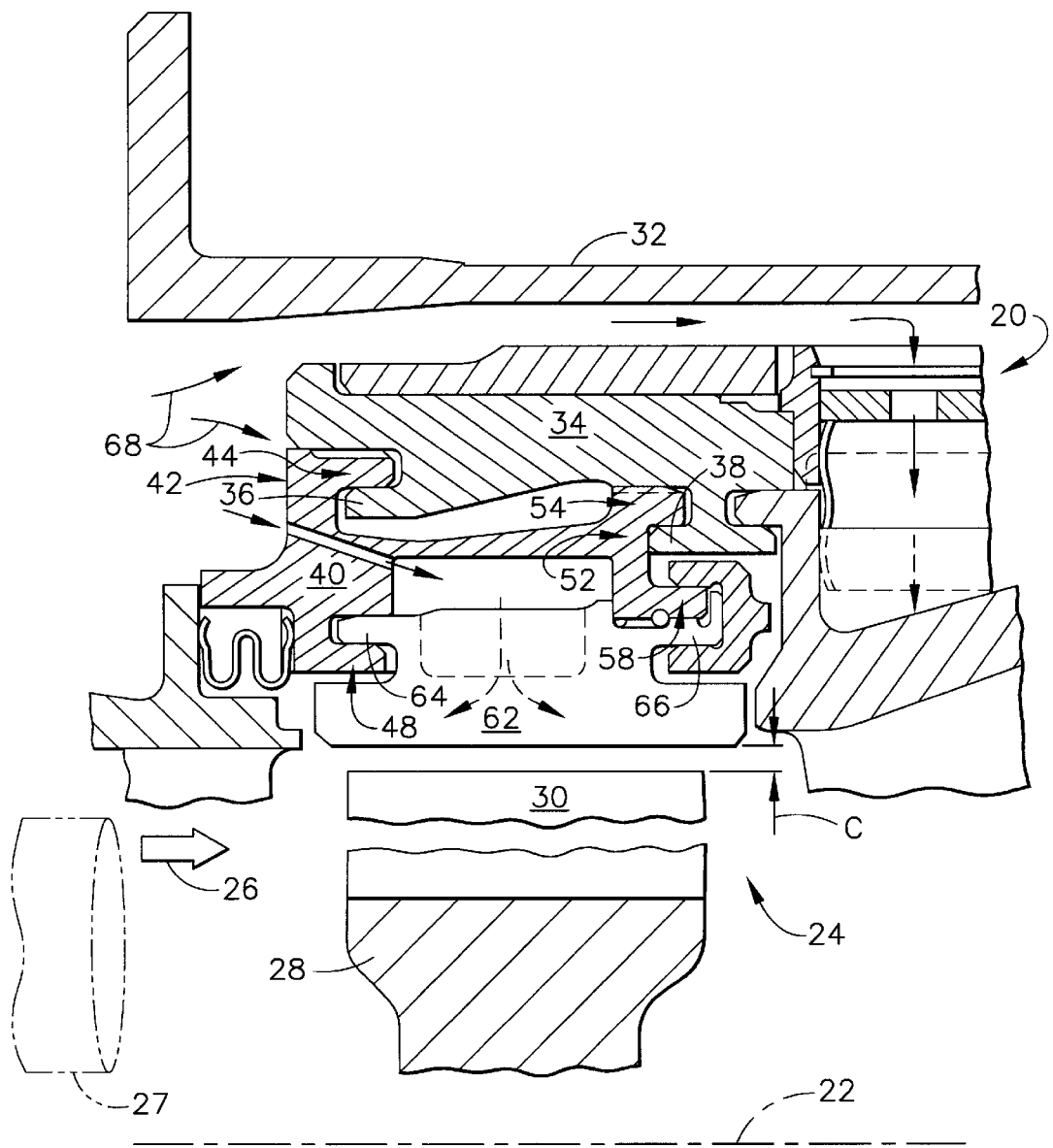
FIG. 1 is a partial sectional view of an axisymmetric gas turbine case, buildup shroud hanger, shroud, and turbine rotor.

The present invention is preferably utilized in relation to a shroud structure, and most preferably the shroud hanger. A shroud structure for an aircraft gas turbine engine is known in the art, except for improvements discussed herein, and is described, for example, in U.S. Pat. Nos. 5,553,999; 5,593,276; and 6,233,822, whose disclosures are incorporated by reference. FIG. 1 depicts the relevant portion of a shroud structure 20 which is axisymmetric about an engine centerline axis 22.

The shroud structure surrounds a turbine 24, illustrated in this case as a high pressure turbine stage. Combustion gas 26 flows from a combustor 27, shown schematically at the left in FIG. 1 and through the turbine 24. The turbine 24 includes a turbine rotor 28 that rotates about the engine centerline axis 22 and turbine blades 30 extending radially from the turbine rotor 28 into the flow of the combustion gas 26.

An outer stator casing 32 is generally axisymmetric about the engine centerline axis 22. The shroud structure 20 includes a shroud support 34 affixed to the outer stator casing 32. The shroud support 34 includes a radially inward forward support hook 36 and a radially inward aft support hook 38.

Figure 2:
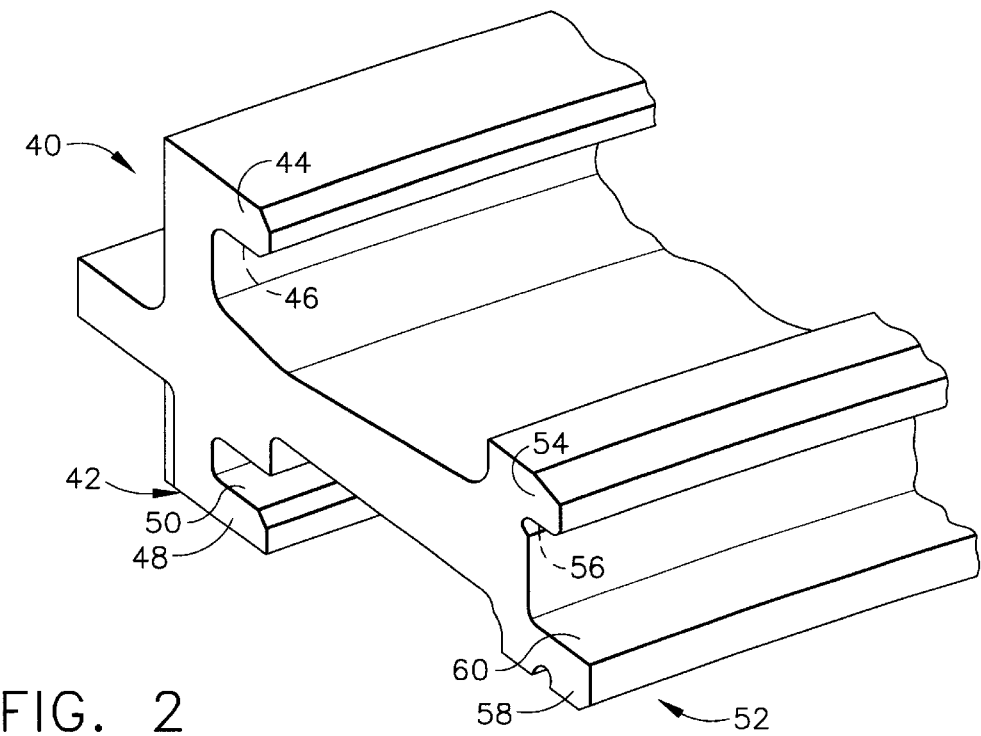
FIG. 2 is a perspective view of the buildup shroud hanger of FIG. 1.
Figure 3:
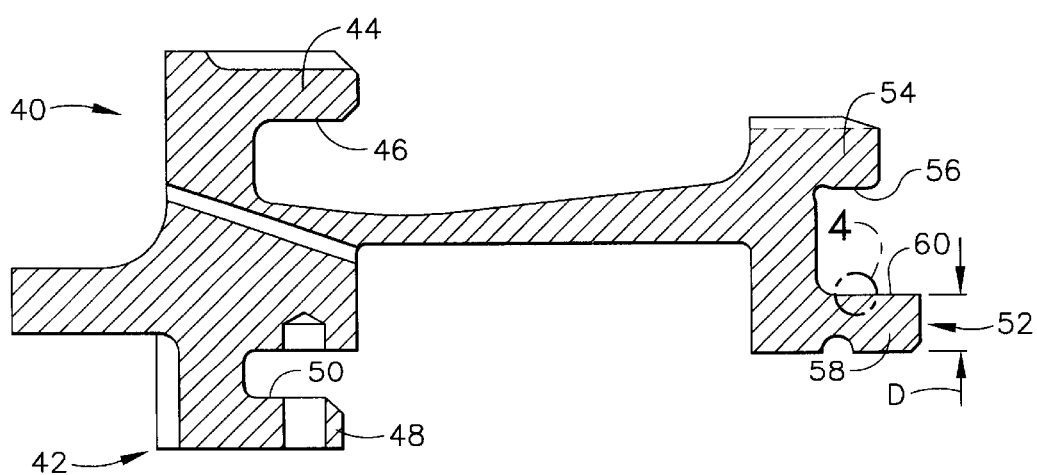
FIG. 3 is an enlarged isolated view of the buildup shroud hanger of FIG. 1

A built-up shroud hanger 40 is engaged to the shroud support 34. The built-up shroud hanger 40 is shown in its relation to the other structure in FIG. 1, and in isolation in FIGS. 2–4. The built-up shroud hanger 40 comprises a series of circumferential segments, 14 segments in a typical case. The built-up shroud hanger 40 includes a forward hook structure 42 having a forward radially outer hook structure 44 with a forward outer hook land structure 46 thereon, and a forward radially inner hook structure 48 with a forward inner hook land structure 50 thereon. The forward radially outer hook structure 44 engages the forward support hook 36 of the shroud support 34. The built-up shroud hanger 40 further includes an aft hook structure 52 having an aft radially outer hook structure 54 with an aft outer hook land structure 56 thereon, and an aft radially inner hook structure 58 having an aft inner hook land structure 60 thereon. The aft radially outer hook structure 54 engages the aft support hook 38 of the shroud support 34.

The built-up shroud hanger 40 or other component is made of a base metal, preferably a nickel-base superalloy or a cobalt-base alloy. A nickel-base alloy is an alloy that has more nickel than any other element, and a cobalt-base alloy is an alloy that has more cobalt than any other element. A nickel-base superalloy is a nickel-base alloy that has a composition such that it is strengthened by the precipitation of gamma prime or a related phase. Some examples of operable nickel-base alloys that may be the base metal include Rene® 80, having a nominal composition in weight percent of about 14.0 percent chromium, about 9.5 percent cobalt, about 4.0 percent molybdenum, about 4.0 percent tungsten, about 3.0 percent aluminum, about 5.0 percent titanium, about 0.17 percent carbon, about 0.015 percent boron, about 0.03 percent zirconium, balance nickel and minor elements; Rene® 77, having a nominal composition in weight percent of about 14.6 chromium, about 15.0 percent cobalt, about 4.2 percent molybdenum, about 4.3 percent aluminum, about 3.3 percent titanium, about 0.07 percent carbon, about 0.016 percent boron, about 0.04 percent zirconium, balance nickel and minor elements; Rene® N5, having a nominal composition in weight percent of about 7.5 percent cobalt, about 7.0 percent chromium, about 1.5 percent molybdenum, about 5 percent tungsten, about 3 percent rhenium, about 6.5 percent tantalum, about 6.2 percent aluminum, about 0.15 percent hafnium, about 0.05 percent carbon, about 0.004 percent boron, about 0.01 percent yttrium, balance nickel and minor elements; Rene® 142, having a nominal composition in weight percent of about 12.0 percent cobalt, about 6.8 percent chromium, about 1.5 percent molybdenum, about 4.9 percent tungsten, about 2.8 percent rhenium, about 6.35 percent tantalum, about 6.15 percent aluminum, about 1.5 percent hafnium, about 0.12 percent carbon, about 0.015 percent boron, balance nickel and minor elements; and Rene® 41, having a nominal composition in weight percent of about 11 percent cobalt, about 19 percent chromium, about 1.5 percent aluminum, about 3.1 percent titanium, about 10 percent molybdenum, about 0.09 percent carbon, about 0.01 percent boron, balance nickel and minor elements. Some examples of operable cobalt-base alloys that may be the base material of a structure that is to be built up include alloy X-40, having a nominal composition in weight percent of about 0.5 percent carbon, about 1 percent manganese, about 1 percent silicon, about 25 percent chromium, about 2 percent iron, about 10.5 percent nickel, about 7.5 percent tungsten, balance cobalt and minor elements; alloy Mar M509, having a nominal composition in weight percent of about 0.6 percent carbon, about 0.1 percent manganese, about 0.4 percent silicon, about 22.5 percent chromium, about 1.5 percent iron, about 0.01 percent boron, about 0.5 percent zirconium, about 10 percent nickel, about 7 percent tungsten, about 3.5 percent tantalum, balance cobalt and minor elements; L-605, having a nominal composition in weight percent of about 52 percent cobalt, about 20 percent chromium, about 10 percent nickel, about 15 percent tungsten, balance minor elements; and alloy HS 188, having a nominal composition in weight percent of about 40 percent cobalt, about 22 percent chromium, about 22 percent nickel, about 14.5 percent tungsten, about 0.07 percent lanthanum, balance minor elements. These are examples of operable alloys, and the invention is not so limited.

A shroud 62 is supported from the built-up shroud hanger 40. The shroud 62 has a forward shroud hook 64 which engages the forward radially inner hook structure 48 of the built-up shroud hanger 40, and an aft shroud hook 66 which engages the aft radially inner hook structure 58 of the built-up shroud hanger 40. The positioning of the shroud 62 defines a clearance C between the shroud 62 and the tip of the turbine blade 30. The shroud 62 comprises a series of circumferential segments, 42 segments in a typical case.

Compressor bleed air, indicated generally by arrows 68, flows around and through the shroud structure 20 to cool it.

Figure 4:
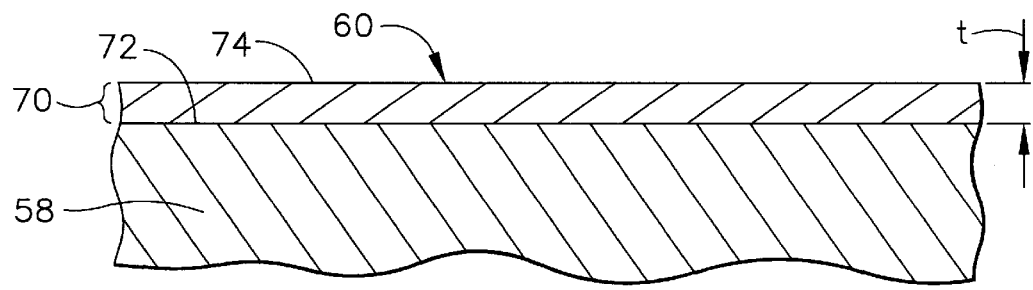
FIG. 4 is a detail sectional view of FIG. 3, taken in region 4.

As seen in FIG. 4, there is a shroud buildup deposit 70 on at least one of the land structures 46, 50, 56, and 60. In the pictured example, the shroud buildup deposit 70 is preferably on the aft radially inner hook land structure 60, and it will be used as the example, but the shroud buildup deposit 70 may be on any of the land structures. After the shroud buildup deposit 70 is deposited on a base-material hook surface 72 of the aft radially inner hook structure 58, an upper surface 74 of the shroud buildup deposit 70 serves as the aft inner hook land structure 60. The shroud buildup deposit 70 preferably has a thickness t of from about 0.001 inch to about 0.004 inch, and most preferably has the thickness t of from about 0.002 inch to about 0.003 inch.

The shroud buildup deposit 70 is formed of a buildup material different in composition from the base material that forms the body of the built-up shroud hanger 40. The base material has a base-material melting temperature, and the buildup material has a buildup-material melting temperature. The buildup-material melting temperature preferably is less than the base-material melting temperature. In the preferred case where the base material is a nickel-base superalloy, the buildup material is a nickel-base alloy. A preferred nickel-base alloy for the buildup material comprises nickel, chromium, and silicon. A most preferred nickel-base alloy for the buildup material has a composition, in weight percent, of about 77 percent nickel, about 15 percent chromium, and about 8 percent silicon, with minor amounts of other elements and impurities present.

Figure 5:
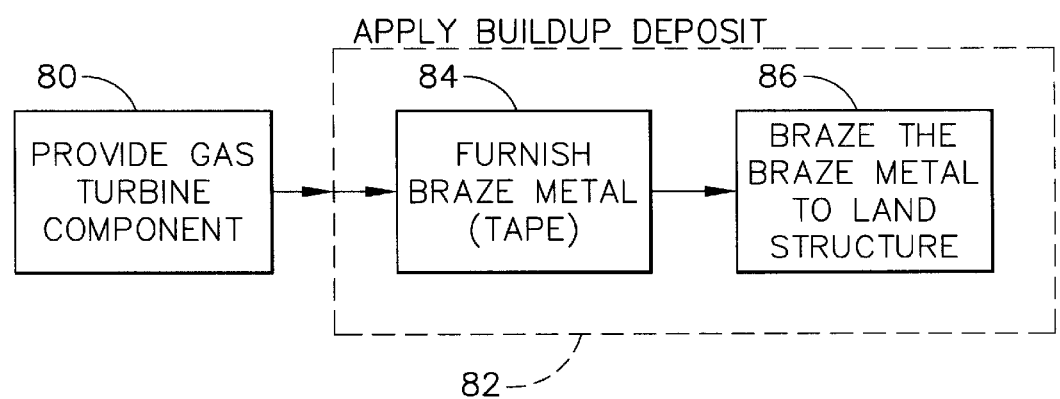
FIG. 5 is a block flow diagram of an approach for practicing the invention.

FIG. 5 depicts a preferred approach for practicing the buildup procedure. A gas turbine component, preferably the shroud hanger prior to buildup, is provided, numeral 80. The shroud hanger or other component may be newly manufactured without any buildup deposit 70 thereon. The component may instead be a component that is being returned from service for rework and repair, and may have no buildup deposit 70 thereon or a preexisting buildup deposit thereon. In the case of the shroud hanger, a thickness dimension D of the hook structure, the aft radially inner hook structure 58 in the example, is too small and is below that permitted by the tolerances of the structure. To increase the thickness dimension D of the hook structure, the shroud buildup deposit 70 is applied, numeral 82, to the relevant under-dimension land structure, the aft inner hook land structure 60 (i.e., the base-metal hook surface 72) in the example of FIG. 4. The shroud buildup deposit 70 is formed of the buildup material and has the thickness as discussed above.

The shroud buildup material 70 may be applied, numeral 82, by any operable technique. A preferred application technique is depicted in FIG. 5. The preferred application approach includes furnishing a braze metal of the buildup material composition, preferably as a braze-metal tape, numeral 84, and brazing the braze metal (tape) to the land structure, such as the aft inner hook land structure 60 as shown in FIG. 4. The use of the braze-metal tape is preferred because it allows the desired composition and thickness of the buildup material to be precisely applied to the area where it is needed, without deposition on other areas where it is not desired.

The braze-metal tape, where used, may be a single-constituent tape, in which powder particles of the final composition of the buildup material are held together with an organic binder. The braze-metal tape may instead be, and most preferably is, a two-constituent braze metal tape. In the two-constituent tape, one of the constituents has a lower melting point than the other of the constituents. The lower melting point is typically achieved by the addition of elements that depress the melting point. So, for example, the first constituent may have a larger alloy-element content (the total weight percent of alloying elements) than the second constituent, so that the first constituent has a lower melting point than the second constituent. Thus, the second constituent may be nearly pure nickel, and the first constituent may be an alloy with elements added to nickel to depress the melting point (i.e., solidus temperature).

In a preferred case of a nickel-base braze tape, a two-constituent braze tape comprises about 80 percent by volume of a first constituent having a composition, in weight percent, of from about 10 to about 30 (most preferably from about 18 to about 20) percent chromium, from about 5 to about 12 (most preferably from about 9.75 to about 10.5) percent silicon, balance nickel and minor amounts of other elements and impurities, and about 20 percent by volume of a second constituent having at least about 99 percent by weight nickel, balance minor amounts of other elements and impurities. The first constituent has a first melting point, about 2075° F. in the example, and the second constituent has a second melting point, about 2650° F. in the example. The two constituents are furnished as powders held together with an organic binding agent such as polyethylene oxide (PEO). In a preferred case of a cobalt-base braze tape, a one-constituent braze tape has a composition, in weight percent, of about 8 percent silicon, 19 percent chromium, 17 percent nickel, 4 percent tungsten, 0.8 percent boron, balance cobalt and minor amounts of other elements.

The braze-metal tape is applied to the land structure where it is needed to increase the dimension D. The braze-metal tape and the shroud hanger are heated to a brazing temperature. The brazing temperature is below the melting temperature of the base material, below the second melting point, and above the first melting point. The organic binding agent vaporizes during the heating. At this brazing temperature, the first constituent melts and bonds to the base material hook surface 72. The second constituent remains solid, aiding the mass in holding its desired shape and thickness, rather than running over the surface of the component. In the case of the preferred two-constituent braze tape, the brazing temperature is preferably from about 1900° F. to about 2300° F., most preferably about 2125+/−25° F. Upon cooling, the shroud buildup deposit 70 solidifies as a solid layer of the required thickness on the built-up shroud hanger 40. The thickness t of the shroud buildup deposit 70 is less than that of the initial braze-metal tape due to consolidation, and the initial thickness of the braze-metal tape is selected with this known shrinkage in mind.

Figure 6:
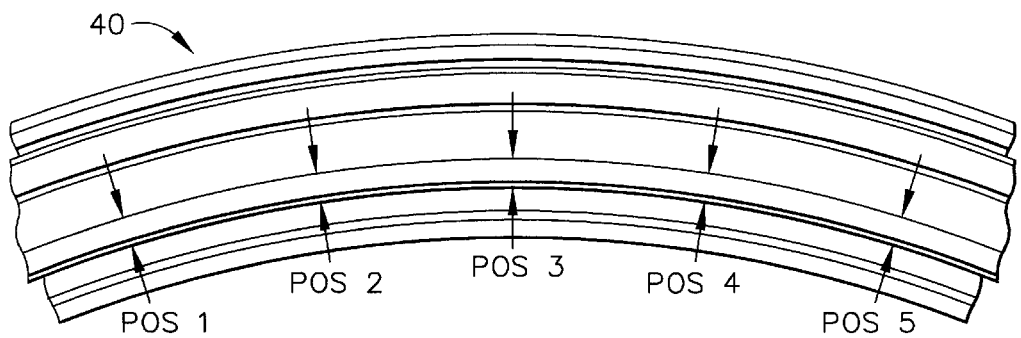
FIG. 6 is an elevational view of the buildup shroud hanger segment.
Figure 7:
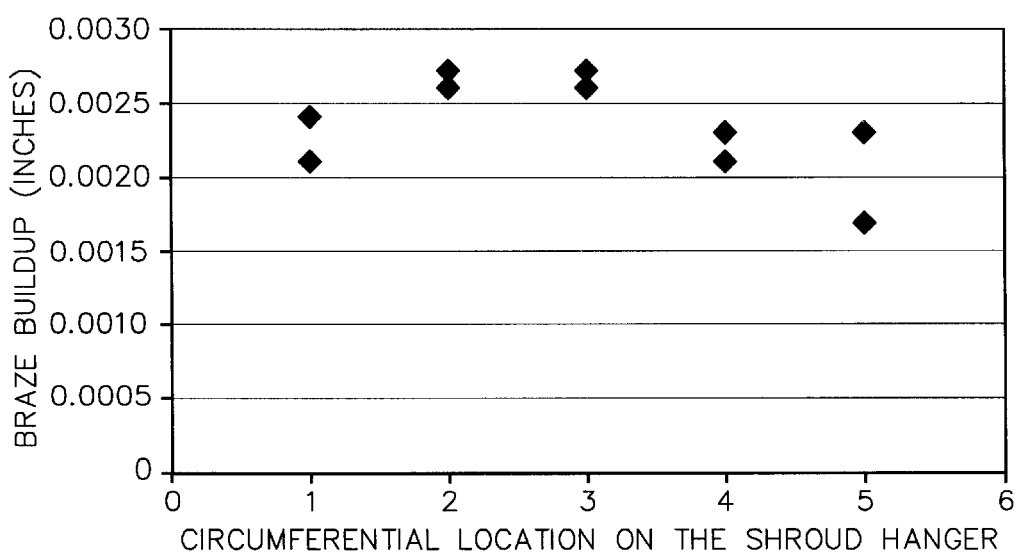
FIG. 7 is a graph of the thickness of the shroud buildup deposit as a function of position on the aft inner hook land of the built-up shroud hanger segment of FIG. 6.

The invention has been reduced to practice using the approach of FIG. 5 with the preferred two-constituent braze tape. FIG. 6 is an elevational view of one circumferential segment of the built-up shroud hanger 40, upon which the test was performed at two different axial locations on one shroud hanger 40, indicating circumferential measurement locations 1–5 at which thickness measurements of the final thickness t of the shroud buildup deposit 70 were made. The objective was to form a shroud buildup deposit 70 about 0.002–0.0025 inch in thickness. This result was achieved at the different locations as may be seen in FIG. 7, with a slight but acceptable variation between the different circumferential measurement locations 1–5.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for preparing a built-up gas turbine component comprising the steps of
   providing a gas turbine component having a component surface and made of a component base metal having a component base metal composition;
   supplying a buildup tape having a net metallic buildup composition different from the component base metal composition, the buildup tape including
      a first metallic constituent having a first melting point,
      a second metallic constituent having a second melting point, the first metallic constituent and second metallic constituent together comprising the net metallic buildup composition, and
      a nonmetallic binder binding together the first metallic constituent and the second metallic constituent;
   applying the buildup tape to the component surface; and
   heating the buildup tape and the component surface to a brazing temperature greater than the first melting point and less than the second melting point, so that the first metallic constituent melts and fuses the first metallic constituent and the second metallic constituent to the component surface as a buildup deposit on the built-up gas turbine component.

2. The method of claim 1, wherein the step of providing includes the step of
   providing a shroud hanger having
      a forward hook structure including
         a forward radially outer hook structure having a forward outer hook land structure thereon, and
         a forward radially inner hook structure having a forward inner hook land structure thereon;
      an aft hook structure including
         an aft radially outer hook structure having an aft outer hook land structure thereon, and
         an aft radially inner hook structure having an aft inner hook land structure thereon; and
   wherein the step of applying includes the step of
      applying the buildup tape to at least one of the land structures.

3. The method of claim 1, wherein the step of providing includes the step of
   providing the gas turbine component made of a nickel-base superalloy base metal, and
   wherein the step of supplying includes the step of
   supplying the buildup tape having a nickel-base alloy net metallic buildup composition.

4. The method of claim 1, wherein the step of supplying includes the steps of
   supplying the first metallic constituent having a first-constituent composition, in weight percent, of from about 10 to about 30 percent chromium, from about 5 to about 12 percent silicon, balance nickel and minor amounts of other elements and impurities, and
   supplying the second metallic constituent having a second-constituent composition, in weight percent, of about 99 percent by weight nickel, balance minor amounts of other elements and impurities.

5. The method of claim 1, wherein the step of supplying includes the steps of
   supplying the first metallic constituent having a first-constituent composition, in weight percent, of from about 18 to about 20 percent chromium, about 9.75 to about 10.5 percent silicon, balance nickel and minor amounts of other elements and impurities, and
   supplying the second metallic constituent having a second-constituent composition, in weight percent, of about 99 percent by weight nickel, balance minor amounts of other elements and impurities.

6. The method of claim 1, wherein the step of supplying includes the step of
   supplying the first constituent having a higher alloying content than the second constituent.

7. The method of claim 1, wherein the step of applying includes the step of
   applying the buildup deposit to a thickness of from about 0.001 inch to about 0.004 inch.

8. The method of claim 1, wherein the step of providing includes the step of
   providing a new gas turbine component.

9. The method of claim 1, wherein the step of providing includes the step of
   providing a gas turbine component which has previously been in service.

10. A method for preparing a built-up gas turbine shroud hanger comprising the steps of
    providing a gas turbine shroud hanger made of a base material and having
       a forward hook structure including
          a forward radially outer hook structure having a forward outer hook land structure thereon, and
          a forward radially inner hook structure having a forward inner hook land structure thereon;
       an aft hook structure including
          an aft radially outer hook structure having an aft outer hook land structure thereon, and
          an aft radially inner hook structure having an aft inner hook land structure thereon; and
    applying a shroud-hanger buildup deposit to at least one of the land structures, the shroud-hanger buildup deposit being a buildup material different in composition from the base material.

11. The method of claim 10, wherein the step of applying includes the steps of
furnishing a braze metal tape, and
brazing the braze metal tape to the at least one of the land structures.

12. The method of claim 10, wherein the step of applying includes the steps of
furnishing a braze metal tape having
a first metallic constituent having a first melting point, and
a second metallic constituent having a second melting point, and
brazing the braze metal tape to the at least one of the land structures at a brazing temperature between the first melting point and the second melting point.

13. The method of claim 12, wherein the step of furnishing includes the steps of
supplying the first metallic constituent having a first-constituent composition, in weight percent, of from about 10 to about 30 percent chromium, from about 5 to about 12 percent silicon, balance nickel and minor amounts of other elements and impurities, and
supplying the second metallic constituent having a second-constituent composition, in weight percent, of about 99 percent by weight nickel, balance minor amounts of other elements and impurities.

14. The method of claim 10, wherein the step of providing includes the step of
providing the gas turbine shroud hanger made of a nickel-base superalloy base material, and
wherein the step of applying includes the step of
furnishing the buildup material as a nickel-base alloy.

15. The method of claim 10, wherein the step of applying includes the step of
applying the shroud buildup deposit to a thickness of from about 0.001 inch to about 0.004 inch.

16. The method of claim 10, wherein the step of applying includes the step of
applying the shroud buildup deposit to a thickness of from about 0.002 inch to about 0.003 inch.

17. The method of claim 10, wherein the step of providing includes the step of
providing a new shroud hanger.

18. A built-up gas turbine shroud hanger, the built-up gas turbine shroud hanger being made of a nickel-base superalloy base material and having
a forward hook structure including
a forward radially outer hook structure having a forward outer hook land structure thereon, and
a forward radially inner hook structure having a forward inner hook land structure thereon;
an aft hook structure including
an aft radially outer hook structure having an aft outer hook land structure thereon, and
an aft radially inner hook structure having an aft inner hook land structure thereon; and
a shroud-hanger buildup deposit on at least one of the hook land structures, the shroud buildup deposit being a nickel-base alloy buildup material different in composition from the nickel-base superalloy base material.

19. The buildup shroud hanger of claim 18, wherein the nickel-base alloy buildup material is an alloy comprising nickel, chromium, and silicon.

* * * * *